(12) United States Patent
Pateux et al.

(10) Patent No.: US 8,320,692 B2
(45) Date of Patent: Nov. 27, 2012

(54) IMAGE ENCODING METHOD AND DEVICE IMPLEMENTING AN IMPROVED PREDICTION, CORRESPONDING DECODING METHOD AND DEVICE, SIGNAL AND COMPUTER PROGRAMS

(75) Inventors: Stéphane Pateux, Rennes (FR); Isabelle Amonou, Cesson Sevigne (FR); Nathalie Cammas, Sens de Bretagne (FR); Sylvain Kervadec, Sens de Bretagne (FR)

(73) Assignee: France Telecom, Paris (FR)

( * ) Notice: Subject to any disclaimer, the term of this patent is extended or adjusted under 35 U.S.C. 154(b) by 70 days.

(21) Appl. No.: 13/002,441

(22) PCT Filed: Jun. 26, 2009

(86) PCT No.: PCT/FR2009/051229
§ 371 (c)(1),
(2), (4) Date: Mar. 18, 2011

(87) PCT Pub. No.: WO2010/001045
PCT Pub. Date: Jan. 7, 2010

(65) Prior Publication Data
US 2011/0188768 A1 Aug. 4, 2011

(30) Foreign Application Priority Data
Jul. 1, 2008 (FR) ...................... 08 54467

(51) Int. Cl.
*G06K 9/36* (2006.01)
*G06K 9/46* (2006.01)
(52) U.S. Cl. ........................................ 382/238
(58) Field of Classification Search .................. 382/232, 382/233, 236, 238, 243; 375/240.01, 240.1, 375/240.12, 240.16, 240.17, 240.24, 240.27, E07.033, E07.104
See application file for complete search history.

(56) References Cited

U.S. PATENT DOCUMENTS
7,280,599 B2 * 10/2007 Karczewicz et al. .... 375/240.17
(Continued)

FOREIGN PATENT DOCUMENTS
WO 0149038 A1 7/2001

OTHER PUBLICATIONS
French Search Report and Written Opinion dated May 7, 2009 from French Application No. 0854467 filed on Jul. 1, 2008.
International Preliminary Report on Patentability dated Mar. 1, 2011 from International Application No. PCT/FR2009/051229, filed Jun. 26, 2009.

(Continued)

*Primary Examiner* — Amir Alavi
(74) *Attorney, Agent, or Firm* — David D. Brush; Westman, Champlin & Kelly P.A.

(57) ABSTRACT

Techniques are provided for encoding and decoding image data. The techniques implement a prediction of data of a current block based on at least one already encoded block or reference block, wherein said prediction step takes into account a set of encoded blocks adjacent to said current block and including blocks that have not yet been considered according to said writing path order. Encoding includes the steps of: generating a dependence tree associating a current block with at least one reference block from which the predicted block associated with the current block has been pre-determined; and inserting information representative of said dependence tree into said set of data associated with each block.

12 Claims, 8 Drawing Sheets

U.S. PATENT DOCUMENTS

| | | | |
|---|---|---|---|
| 7,826,531 B2 * | 11/2010 | Wang et al. | 375/240.1 |
| 8,204,125 B2 * | 6/2012 | Au et al. | 375/240.16 |
| 8,213,511 B2 * | 7/2012 | Swami et al. | 375/240.16 |
| 2006/0067399 A1 | 3/2006 | Zhang | |
| 2006/0093041 A1 | 5/2006 | Cieplinski et al. | |
| 2006/0193388 A1 * | 8/2006 | Woods et al. | 375/240.16 |
| 2007/0014362 A1 * | 1/2007 | Cruz et al. | 375/240.16 |
| 2010/0098166 A1 * | 4/2010 | Budagavi et al. | 375/240.16 |
| 2011/0188768 A1 * | 8/2011 | Pateux et al. | 382/238 |

OTHER PUBLICATIONS

International Search Report dated Oct. 21, 2009 for corresponding International Application No. PCT/FR2009/051229, filed Jun. 26, 2009.

Taichiro Shiodera et al., "Block Based Extra/Inter-Polating Prediction for Intra Coding" Image Processing, 2007, ICIP 2007, IEEE International Conference on, IEEE, PI, Sep. 1, 2007, pp. VI-445, XP031158358.

* cited by examiner

| | M | A | B | C | D | E | F | G | H |
|---|---|---|---|---|---|---|---|---|---|
| | I | | | | | W | | | |
| | J | | | | | V | | | |
| | K | | | | | U | | | |
| | L | | | | | T | | | |
| X | Y | Z | N | O | P | Q | R | S | |

| idx | dvi | dvj | res |

| N | dvi1 | dvj1 | ... | dviN | dvjN | res |

| N | dvi1 | dvj1 | ref1 | ... | dviN | dvjN | refN | res |

IMAGE ENCODING METHOD AND DEVICE IMPLEMENTING AN IMPROVED PREDICTION, CORRESPONDING DECODING METHOD AND DEVICE, SIGNAL AND COMPUTER PROGRAMS

CROSS-REFERENCE TO RELATED APPLICATIONS

This application is a Section 371 National Stage application of International Application No. PCT/FR2009/051229, filed Jun. 26, 2009 and published as WO 2010/001045 on Jan. 7, 2010, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The field of the disclosure is that of the encoding and decoding of a video stream consisting of a series of successive images. More specifically, the disclosure can be applied to image compression or the compression of video sequences using block transforms.

Thus, the disclosure pertains to prediction techniques implemented to encode and decode a block of images.

The disclosure can be applied especially to video encoding which will be implemented in future video compression standards.

BACKGROUND OF THE DISCLOSURE

Numerous video data compression techniques are already known. These include various video encoding techniques, for example those implementing video compression standards coming from the MPEG (MPEG-1, MPEG-2, MPEG-4 part 2, etc) organization or from the ITU-T (H.261, . . . , H.264/AVC) organization, use a block-wise representation of the video sequence. Thus, according to the H.264 technique, each image can be sub-divided into slices which are then sub-divided into macroblocks. Each macroblock is then sub-divided into blocks. A block is constituted by a set of pixels.

An example of a slice formed by nine macroblocks $11_1$ to $11_9$ is illustrated schematically in FIG. 1. During the encoding and decoding operations, the slices are scanned macroblock by macroblock along a path 12 defined systematically or specified by descriptive elements planned for this purpose, that are present in the stream.

The approach is generally the same for the constituent blocks of a macroblock. A macroblock may be formed, in particular, by 4×4 or 16×16 blocks. According to the prior art techniques, these macroblocks and blocks are encoded by intra-image or inter-image prediction.

Here below, we consider groups of blocks, the term "group" can correspond especially to an image or a slice constituted by a set of macroblocks or to a macroblock, i.e. a set of blocks. The term "block" can be then applied respectively to a macroblock or to a block according to the terminology of the H.264 standard.

According to the H.264 technique, a block may be decoded by:
  a temporal prediction, i.e. a reference to a reference block belonging to one or more other images; and/or
  a prediction known as a "spatial" prediction as a function of the neighboring blocks of the current image.

In the latter case, the prediction can be done only from blocks that have been previously encoded.

Thus, in the example of FIG. 2, if we consider the scan 12 of FIG. 1, the block $11_5$ can be predicted only as a function of the previous blocks $11_1$ to $11_4$. The following blocks $11_6$ to $11_9$ which have not been encoded cannot be taken into account.

As illustrated in FIGS. 3A and 3B, in a group of blocks, it is possible to distinguish two zones 31 and 32, generally called respectively a causal zone 31 and an anti-causal zone 32. The causal zone of a group of blocks is the zone of the image comprising the blocks situated before the current block in the direction of scanning of the blocks in the image.

In the H.264 encoder, the direction of scanning of the blocks in the image also corresponds to the direction of scanning of encoding and decoding of the blocks, as well as the direction of scanning of the writing and reading of the encoded data of the blocks in the stream. Here below, the term "causal zone" denotes the zone corresponding to the blocks situated before the current block in the direction of scanning of the writing and reading of the blocks in the stream. The anti-causal zone is the zone of the image comprising the blocks situated after the current block in the direction of scanning of writing or reading of the blocks in the stream.

The prior-art encoding techniques and especially the H.264 encoders use only the blocks of the causal zone for the prediction of a current block since the blocks of the anti-causal zone are not yet encoded or decoded, and are therefore not available for the prediction.

Several types of scans have been defined, as such as the one illustrated in FIG. 1, generally known as a raster Scan or the spiral Scan which proposes the scanning of a group of blocks from its center in going towards the edges by a spiral-shaped scan.

The H.264/AVC standard has defined different patterns for each slice. However, just as in the case in the previous techniques, the scan slice is predefined and leads to distinguishing blocks that can be used for the prediction (causal zone) and blocks that are not usable (anti-causal zone).

The predictions associated with a block may be of various types.

Thus, in the H.264/AVC encoding standard, a texture prediction is proposed along five possible directions of prediction, in the case of blocks sized 4×4. For each block pixel, the prediction is obtained by extending the last line or column of the reference block in a combination of pixels of the last row and/or column.

The invention also proposes, in this encoding technique, a motion prediction. The reference blocks used in the inter prediction or temporal prediction are identified by means of motion vectors, encoded in the stream, in using a prediction by vectors of blocks of the causal and temporal neighborhood. For example, a vector of a block to be encoded may be predicted by computing the median vector from a vector of the top, top left-hand, and left-hand of the block to be encoded.

There is provision also for a prediction known as shifted intra-prediction using already reconstructed blocks of the image as the basis of prediction of a block to be encoded. A reference block that is the closest to the block to be encoded is sought in the part of the image to be encoded that is already reconstructed. The difference between the values of the pixels of the target reference block and the block to be encoded is minimized, and the target reference block is identified in the decoder by means of the encoding of an intra-image motion vector indicating the shift relatively to the block to be encoded to retrieve the reference block.

One drawback of these different prediction techniques, which rely on the use of a write and read scan, of the blocks in the stream or signal produced is that the possible prediction references are limited to the causal zone. Indeed, in certain situations, it would be more efficient for reasons of similitude between the blocks for example to use a prediction base that is a block present in the anti-causal zone.

This however is not possible in the prior art because the blocks of the anti-causal zone have not yet been processed and are therefore not available for the prediction.

It must be noted that, for those skilled in the art, this situation is unavoidable as can be seen from the term "anti-causal zone" and not as a drawback liable to be corrected.

SUMMARY

An embodiment of the invention relates to a method for encoding image data, an image being sub-divided into blocks, said method implementing the steps of:
  predicting the data of a current block as a function of at least one other already encoded block known as a reference block, delivering a predicted block;
  determining information on residues by comparison of said current block and of said predicted block;
  encoding said information on residues;
  transmitting and/or storing a data signal comprising a set of data associated with each block, comprising said information on residues according to a predetermined write scan order for scanning the writing of the data associated with the blocks encoded in said signal.

According to an embodiment of the invention, said prediction step takes account of a set of encoded blocks that are neighbors of said current block, comprising blocks not yet considered along said write scan order and the encoding method comprises steps for:
  building a dependency tree associating, with a current block, at least one reference block from which the predicted block associated with said current block has been predetermined;
  inserting information representing said dependency tree in said set of data associated with each block.

Thus, the decoding of an image can be done in a decoding order that is a function of said tree and not imperatively according to the write scan order.

Thus, an embodiment of the invention relies on an approach different from the techniques of the prior art which use the same direction of scanning of the blocks in the image for the encoding and decoding as the direction of scanning of the writing/reading of the blocks in the stream. On the contrary, an embodiment of the invention distinguishes between the encoding scan and the write scan and enables the choice of a more efficient encoding scan whereas the write scan remains unchanged. An embodiment of the invention therefore makes it possible, when this is desirable, to take account of the reference blocks usually ignored because they belong to the anti-causal zone.

As explained here below, distinct scans are also used for the decoding. The read scan corresponds to the write scan. On the contrary, the encoding scan may be distinct from the decoding scan (several decoding scans may be possible). The decoding scan will be determined during the decoding by means of the dependency tree built during the encoding.

According to one embodiment of the invention, said prediction step comprises at least two prediction passes, according to distinct prediction scan orders, and the encoding method comprises a step of selection of one of said prediction scan orders according to a predetermined criterion of efficiency.

In other words, several encoding scans are tested, and the most efficient one is chosen. In contrast, the write scan order remains unchanged and is therefore independent of the scanning, or order, of encoding selected.

Said criterion of efficiency may especially take account of the bit rate needed for the encoding of said blocks and a piece of information representing the distortion.

An embodiment of the invention also concerns an image data encoding device implementing the encoding method described here above. Such a device comprises especially:
  means for predicting the data of a current block as a function of at least one other already encoded block known as a reference block, delivering a predicted block;
  means for determining information on residues by comparison of said current block and of said predicted block;
  means for encoding said information on residues;
  means for transmitting and/or storing a data signal comprising a set of data associated with each block, comprising said information on residues according to a predetermined write scan order for the data associated with the blocks encoded in said signal.

According to an embodiment of the invention, said prediction means take account of a set of encoded blocks that are neighbors of said current block, comprising blocks not yet considered along said write scan order and said device comprises:
  means for building a dependency tree associating, with a current block, at least one reference block from which the predicted block associated with said current block has been predetermined;
  means for inserting information representing said dependency tree in said set of data associated with each block.

An embodiment of the invention also pertains to a computer program product downloadable from a communications network and/or stored on a computer-readable carrier and/or executable by a microprocessor, characterized in that it comprises program code instructions for executing the steps of the encoding method described here above, when it is executed on a computer.

An embodiment of the invention also concerns an image data signal encoded according to this encoding method according to which, an image being subdivided into blocks, at least one prediction pass is implemented, and comprising, for a current block, a set of data comprising:
  pieces of data representing a dependency tree associating, with said current block, at least one reference block from which the predicted block associated with said current block had been predetermined;
  information on residues corresponding to a difference between said current block and the corresponding predicted block.

Thus, the signal according to an embodiment of the invention contains information, in the form of a dependency tree, enabling the decoders to determine their decoding scan (which, as the case may be, could be distinct from the read scan and/or the encoding scan).

According to one particular embodiment of the invention, said pieces of data representing a dependency tree include a piece of information specifying the number of reference blocks taken into account for said current block and, for each reference block, pieces of data defining a vector linking said reference block and said current block.

An embodiment of the invention also pertains to a data carrier comprising at least one image data signal as described here above.

An embodiment of the invention further pertains to a method for decoding a signal encoded according to the encoding method described here above.

According to an embodiment of the invention, for at least one of said blocks, the decoding is done according to a decoding order distinct from said write scan order and the method comprises the following steps for a current block:

- extracting, from said set of data, information representing a dependency tree associating, with a current block, at least one reference block from which the associated predicted block associated with said current block had been predetermined;
- decoding said block when the reference block or blocks identified in said dependency tree have already been decoded, comprising the following sub-steps:
  - predicting a predicted block from said reference block or blocks;
  - reconstructing a decoded block from said predicted block and as a function of information on residues presented in said set of data.

Thus, according to an embodiment of the invention, the decoding is not done according to the block read scan but according to a distinct decoding scan which takes account of the dependency tree. Indeed, the analysis of this tree is used to determine whether a current block can be decoded at a given point of time (as a function of the blocks already read in the scan order and already decoded) or whether it is necessary to wait for the decoding of one (or more) reference blocks which have not yet been decoded.

According to one particular embodiment, the decoding method comprises the following steps for a current block:

- if the reference block or blocks identified in said dependency tree have already been decoded, immediate decoding of said current block;
- if not, inserting the set of data in said current block in a waiting stack;
- processing of the following block according to said write scan order.

According to a first particular approach, the decoding method can include a step for storing reference blocks necessary to decode a waiting block, and said waiting block is decoded as soon as all the reference blocks necessary are available.

According to another particular approach, the decoding can be done in successive passes according to said write scan order, a current block being decoded during one of said passes if all of said reference blocks are available.

As can be seen, the decoding scan order can vary depending on the applications. It is possible especially to try and decode a block as soon as possible (first approach) or make successive passes and decode only those blocks at each pass for which it is possible (second approach).

Many adaptations and options can be envisaged, for prediction, in encoding or in decoding. Thus, it can be planned that, for at least one current block, said prediction sub-step takes account of at least two reference blocks, a weighting value being allotted to each of said reference blocks.

It is also possible to provide that, for at least one current block, said prediction sub-step takes account of at least one reference block overlapping at least two source blocks.

An embodiment of the invention also pertains to a computer program product downloadable from a communications network and/or stored on a computer-readable carrier and/or executable by a microprocessor, characterized in that it comprises program code instructions for executing the steps of the decoding method described here above, when it is executed on a computer.

An embodiment of the invention finally pertains to a device for decoding a signal encoded according to the encoding method described here above, and implementing decoding means providing, for at least one of said blocks, for a decoding according to an order of decoding distinct from said write scan order. This decoding device also comprises, for the decoding of a current block:

- means for extracting, from said set of data, information representing a dependency tree associating, with a current block, at least one reference block from which the associate predicted block associated with said current block had been predetermined;
- means for decoding said block as a function of information on residues present in said set of data when the reference block or blocks identified in said dependency tree have already been decoded.

BRIEF DESCRIPTION OF THE DRAWINGS

Other features and advantages shall appear more clearly from the following description of an embodiment, given purely by way of illustrative and non-exhaustive examples, and from the appended drawings, of which.

DETAILED DESCRIPTION OF ILLUSTRATIVE EMBODIMENTS

Figure 1:
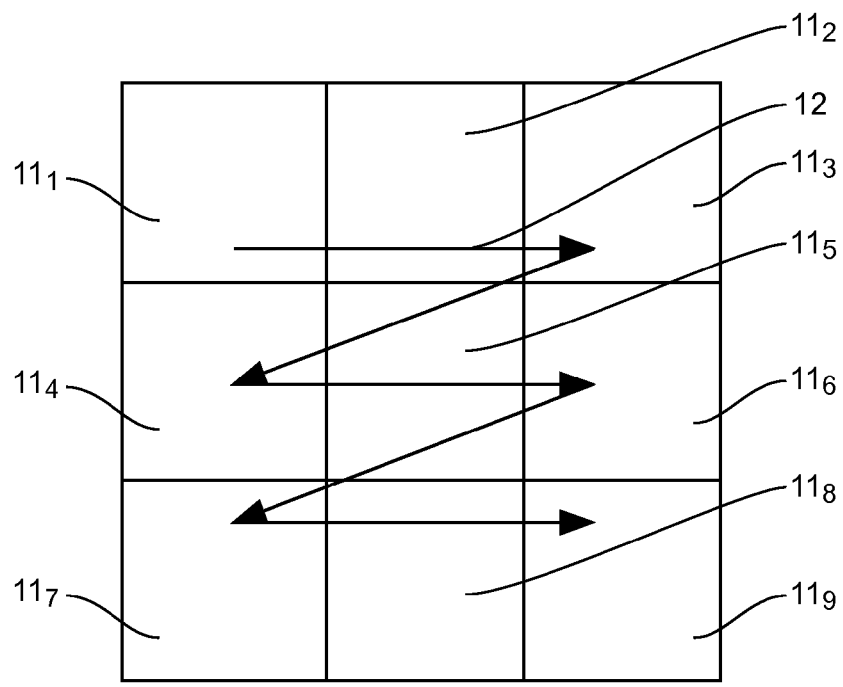
FIG. 1 already commented upon in the introduction illustrates an example of groups of blocks and in a corresponding order of progress.

1. Reminder of the Principles of an Embodiment of the Invention

An embodiment of the invention therefore proposes a technique to broaden the possibilities of spatial prediction for a given block. These predictions are applicable to the textural information of a block as well as motion information.

The steps of the process of compression of an image according to an embodiment of the invention comprise two particular stages. One is the encoding stage which consists in performing different operations of processing and transformation on a block of the image to be encoded (estimation/motion compensation, DCT transformation, quantification, etc), and the other stage is the writing stage for producing the syntax associated with the block of the image and writing it in the stream representing the compressed image. According to an embodiment of invention, the order in which the blocks are encoded differs (at least for certain blocks) from the order in which the blocks are scanned in the image. By contrast, the order in which the encoded blocks are encoded in the stream is not modified.

The corresponding stages of the process for decompressing the image are respectively a phase of decoding (motion compensation, inverse DCT transformation, inverse quantification, reconstruction, etc), and a stage for reading the syntax also known as parsing.

According to an embodiment of the invention the write and read scan order (also called <<order>> for the sake of simplicity) may be distinct from the encoding or decoding order.

According to an embodiment of the invention, the block to be encoded, or current block, can thus use blocks situated in the causal zone and in the anti-causal zone of the current block as prediction references. It is furthermore possible to use several (temporally and/or spatially) neighboring blocks as prediction references and apply a weighted sum.

To this end, an embodiment of the invention proposes, at least for certain blocks, to modify the order of decoding of the blocks in relation to the order of the reading of the blocks in the stream (or signal) or with respect to the order in which the blocks are scanned in the image slice.

It may be recalled that an embodiment of the invention can be applied to both the blocks and to macroblocks as understood in the H.264/AVC standard. The term <<block>> in the description can thus be interpreted as referring to a <<macroblock>> or <<block>> as understood in this standard except when the contrary is stated. Thus, the example given here below pertains to macroblocks.

In one embodiment, the macroblocks are thus decoded according to a particular decoding order, defined recursively on the basis of the prediction data used by the macroblocks. To enable this decoding, a tree of mutual dependency of the macroblocks is defined. The decoding starts with the macroblocks situated on the leaves of the tree and goes back to the roots. In this embodiment, the decoding order is modified relatively to the reading order, which remains the classic order in which the blocks are scanned in the image.

This technique offers several advantages, especially:
an improvement in the compression of the stream;
an increase in complexity is limited to the decoder;
an increase in complexity that can be controlled at the encoder.

The technique introduces a slight increase in complexity in the encoder, because it is preferable to make several passes on the image for maximum efficiency. However, this increase in complexity can be controlled by means of appropriate heuristic solutions.

The definition and building of a tree also assumes the performance of additional processing operations. However, the number of dependencies in the tree can be restricted in order to control the complexity.

The reading and decoding scan operations are identical in all video compression standards. This has the advantage of making it possible to read the syntax associated with a block and then decode this block immediately. The reading and decoding can be done however successively, i.e., the decoding can start once all the blocks have been read. According to an embodiment of the invention, the order in which the encoded blocks are read is not modified and is identical to the order in which the blocks are written to the image. However, the decoding order is modified and is linked to the prediction mode for each block.

In the embodiment described here below in detail, to encode or decode a block or macroblock, an encoding/decoding context is set up. This context indicates those blocks that can be used to build the prediction for the encoding/decoding of the current block. These blocks are called possible reference blocks here below. The possible reference blocks are blocks that have been previously encoded/decoded and reconstructed.

However, the reference blocks may be situated in the causal zone or in the anti-causal zone of the block to be encoded/decoded, these zones being defined according to the direction in which the blocks are scanned in the image or the direction in which the blocks are read or written in the stream.

A non-exhaustive list of the types of prediction to which the algorithm can be applied is proposed in the next section. Naturally, other types of prediction can be used.

The encoding and decoding algorithm is the same for all the types of prediction used, once the context of encoding/decoding of the block has been established.

The embodiment described here below is situated in an encoding context corresponding to the one used in the H.264/AVC encoders, or the H265 encoders of the future.

2. Examples of Types of Prediction

A current block uses one or more reference blocks to set up a prediction. The difference, or residue, between the current block and the prediction, i.e., the predicted block, is then encoded and transmitted (and/or stored depending on the application). At the time of decoding, the difference received is added to the prediction to reconstruct the block.

2.1 Prediction of Texture

In this application, an embodiment of the invention proposes to extend the prediction used in H.264/AVC encoders. Indeed, the use of the anti-causal zone of the block makes it possible to add the following blocks in order to build the prediction of a block to be coded: right-hand block, bottom right-hand block, bottom block, bottom left-hand block.

Figures 4, 5:
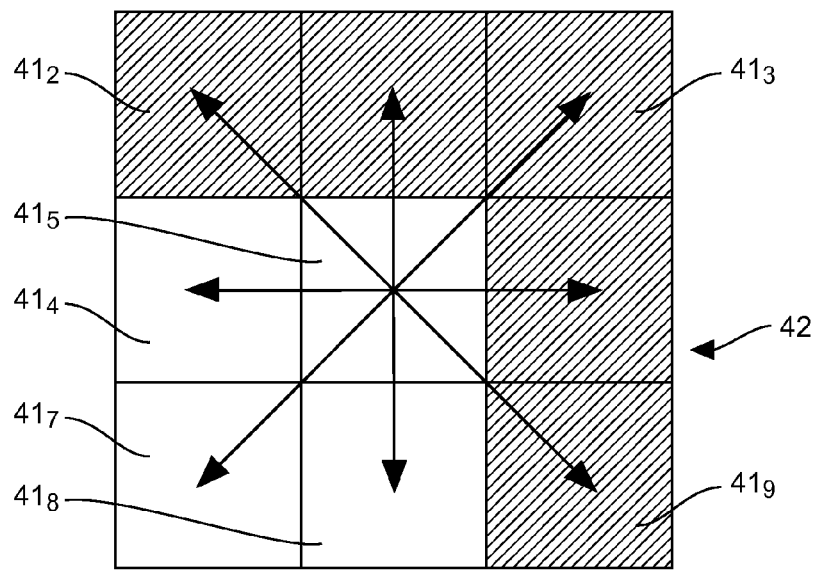
FIG. 4 illustrates the principle of an embodiment of the invention by comparison with FIG. 2.
FIG. 5 presents the pixels used for the intra-spatial prediction according to an embodiment of the invention in a case of a 4×4 block.

FIG. 4 illustrates all the reference blocks possible $41_1$ to $41_4$ and $41_6$ to $41_9$ that can be used for a spatial prediction of a block $41_5$ according to the approach of an embodiment of the invention.

In order to encode each current block $41_5$ in a closed loop, i.e., on the basis of the encoded/decoded blocks, for improved efficiency of compression and in order to avoid phenomena of drift between the encoder and decoder, it is necessary to allow only predictions that use only already encoded blocks (shaded zone 43 in the example of FIG. 4). The possible predictions for the central block $41_5$ are predictions using possible reference blocks situated in the causal zone ($41_k$, $41_2$, $41_3$) and in the anti-causal zone ($41_6$, $41_9$) of the block to be encoded.

Naturally, the block $41_5$ also has temporal predictions already possible in the H.264/AVC encoder.

FIG. 5 illustrates the pixels used for an intra-spatial prediction. Apart from the known types of predictions, (pixels A to M), corresponding to the causal zone and defined in the H.264/AVC standard, the approach of an embodiment of the invention makes it possible to propose types of prediction using the new pixels situated in the anti-causal zone (pixels N to Z). These are obtained by inverting the direction of prediction existing in the H.264/AVC encoder.

For each pixel of the block, the prediction is obtained by extending the first row or column of the reference blocks (mode 0 or 1, according to the terminology of the H.264/AVC standard) or by a combination of pixels of the first row and/or column (modes 2 to 8).

The signaling of the new modes introduced can be done for example:
either by the introduction of an addition flag for each block: the type of prediction is already present in the syntax of the H.264/AVC encoder for each block. Its value associated with the value of the flag would indicate the sense of the type of prediction. A value 0 would indicate the directions of the H.264/AVC encoder, while a value 1 would indicate the new directions;
or by the introduction of new types of prediction: the type of prediction is already present in the syntax of the H.264/AVC encoder for each block. The syntax element representing it would then take the values ranging from 0 to 17, 0 to 8 being the types of prediction used by the H.264/AVC encoder, and 9 to 17 being the new types of predictions.

Similarly, it is possible to add types of predictions that use pixels from the first row of the bottom block and from the last row of the top block or again by using pixels from the first column of the right-hand block and last column of the left-hand block. Predictions of this type are added by encoding an additional flag or by defining values of supplementary types of prediction.

The approach described here above can be applied to 4×4 sized blocks. A similar extension can be made for other types of blocks, and for example 16×16 sized blocks.

The encoding of the syntax element of the types of prediction can take account of the context of the blocks neighboring the block to be encoded in order to optimize the encoding of the syntax element for example. If blocks neighboring the block to be encoded have not yet been encoded, they cannot be used to predict the block to be encoded, and certain directions of prediction will then become impossible.

2.2 Motion Prediction

The approach of an embodiment of the invention can also be used to broaden the prediction of motion relatively to the H.264/AVC technique. The use of the anti-causal zone of a block makes it possible to add the following blocks to build the prediction of the motion vectors of a block to be encoded: right-hand block, bottom right-hand block, bottom block, bottom left-hand block.

An additional piece of information must be encoded in the stream in order to indicate those blocks that have been used to predict motion vectors. This information can be inserted by means of the encoding of an index. The index represents the prediction vector used to predict the motion of the block to be encoded from a set of predefined prediction vectors.

Figures 6, 7, 8, 9:
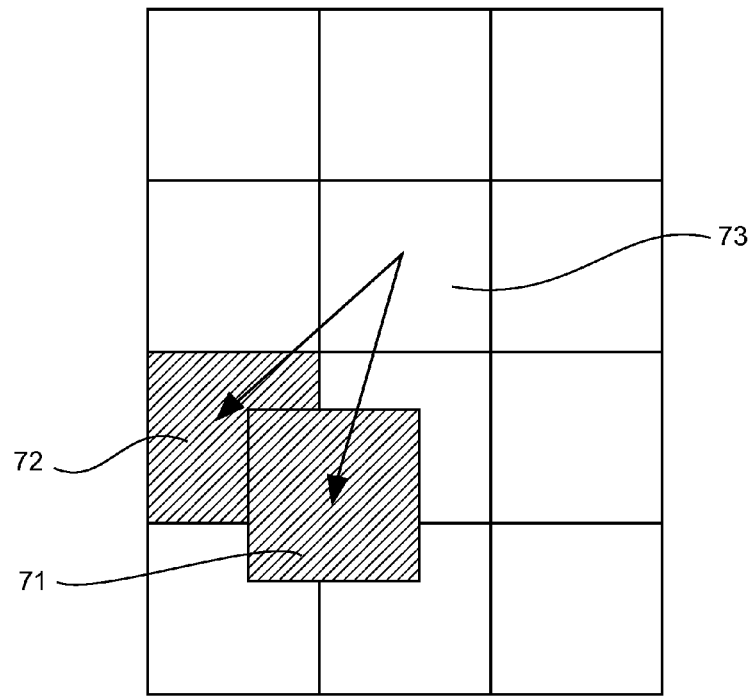
FIG. 6 illustrates an example of a structure of a signal according to an embodiment of the invention in the case of an encoded block in inter mode.
FIG. 7 presents an example of prediction taking account of several and indeed all preference blocks.
FIG. 8 illustrates an example of encoding syntax when an embodiment of the invention, for an intra-coded image is in intra-shifted mode.
FIG. 9 presents an example of syntax in the case of the type of encoding of an inter block.

This set is adaptive to each block. It contains a number N of predicting vectors. It can contain the vectors of the causal neighborhood and of the non-causal neighborhood of the block to be encoded, the median vector, the vector of a block that is co-localized in another image. FIG. 6 illustrates the syntax associated with this mode.

For a block encoded in inter mode, the data items of a block include:
an index idx indicating the prediction vector used;
the residues of the motion vector dvi and dvj; and
the residue res of the block texture.

2.3 Shifted Intra Prediction

An embodiment of the invention can also be used to extend the shifted intra prediction mode of the H.264/AVC standard, in permitting the use of reconstructed blocks in the non-causal zone. The signaling done by means of a motion vector does not change.

Further more, this prediction of a block by means of a vector can be computed on the basis of more than one block coming from the same direction or from another direction. It is thus possible to define a multi-dimensional prediction.

The prediction (the predicted block) Pred associated with a current block B is then computed using the weighted sum of the blocks of the different directions used: for the pixels (i,j) of the block B, the prediction is then:

$$Pred(i, j) = \sum_{n<N} w_n Itn(i + vi_n, j + vj_n)$$

with:
N the number of reference blocks used for the prediction of B,
($vi_n$, $vj_n$) a vector indicating a shift to be applied to the block B in the image
Itn to retrieve the reference block in the image Itn,
wn a weight weighting the participation of the reference block.

In a first approach, all the reference blocks can participate equally in the computation of the overall prediction. The weights are then 1/N.

According to another approach, the blocks can participate in the computation of the overall prediction with a weight that is inversely proportional to the distance between the reference block and the block to be encoded.

The image Itn can be the image to be encoded or it can be another image.

Just as in the case of the temporal prediction, the reference block indicated by the vector (vin,vjn) can be a block of pixels not aligned with the grid for subdividing the image into blocks. The reference block used is then the zone of pixels having the same size as the block to be encoded, with its point of origin being given by the starting point of the block to be encoded to which the vector is added.

Thus, reference block 71 can overlap several blocks of the grid as shown in FIG. 7. This FIG. 7 furthermore illustrates the way in which two reference blocks 71 and 72 have been taken into account for the prediction of the block 73, as described here above.

Similarly, if the vector is a sub-pixel vector, the zone pointed to by the vector must be over-sampled in order to reconstruct the sub-pixel positions of the reference block.

This step is similar to the temporal prediction, using a motion vector with the sub-pixel precision of an H.264/AVC encoder, except that this prediction is done in the current image to be encoded.

In this mode of extended, shifted intra prediction, the pieces of information to be encoded are the following:

the number of reference blocks used for the prediction;
for each reference block, the direction of prediction; the motion vector;
for each reference block the image used for the prediction (the image to be encoded itself or another image in the case of temporal prediction).

Here it is possible to distinguish between intra and inter images. The intra images are encoded only with reference to themselves while the inter images are encoded with reference to one or other images or with reference to themselves.

The syntax for encoding a block of an encoded intra image in shifted intra image is illustrated in FIG. 8.

The encoded data are the following:
the number of reference blocks used: N;
for each reference block $81_1$ to $81_N$, the motion vector residue: dvi,dvj. The vector can be encoded by prediction relatively to the vectors of already encoded blocks situated in the causal zone of the block to be encoded. In this case, only the residue is encoded in the header;
the transformed and quantified coefficients of the residue of the block: res.

An inter image may contain blocks:
inter: encoded by prediction relatively to one or more encoded/decoded images of the sequence; or
intra: encoded by prediction relatively to blocks of the image to be encoded.

The syntax of the intra blocks in shifted intra mode is the same as that proposed by an embodiment of the invention for the blocks of an intra image.

The syntax of the inter blocks is modified in order to add the possibility of predicting the inter block in relation to a block of the image to be encoded in addition to the blocks of some or other of the images, for example in the form illustrated in FIG. 9.

For each block, the header of the block indicates:
the number of reference blocks used: N;
for each reference block $91_1$ to $91_N$, the motion vector residue: dvi, dvj;
for each reference block $91_1$ to $91_N$, the index of the image to which this block belongs: ref.

The vector is encoded by prediction relatively to the vectors of blocks already encoded, situated in the causal zone of the block to be encoded. Only the residue is encoded in the header.

In the particular embodiment described here, the rest of the header of the block does not change relatively to the syntax of the H.264/AVC encoder. Similarly, the rest of the data of the block does not change. It corresponds to the transformed and quantified coefficients of the residue of the block.

For an inter image as for an intra-image, the number N of reference blocks used for the prediction can be limited to 1, 2 or 3. This limitation can be indicated in the header of the data of the image, in encoding Nmax as the maximum possible number common to all the blocks.

In order to optimize the encoding of the information in the header, where N is limited, the type of encoding of the blocks can be modified by indicating, in addition to the type, i.e. whether it is intra or inter, the number of reference blocks that can be used for a prediction.

For example, the encoding modes may then be: INTRA-1REF, INTRA-2REF, INTER-1REF, INTER-2REF; these modes indicate the type of block, whether intra or inter, and the number of reference blocks used. They are added to the INTRA/INTER mode of the H.264/AVC encoder. They are expressed in the same way for the different instances of partitioning into sub-blocks as with the older modes.

In this variant, the syntax of the intra and inter blocks no longer includes the field N. Its value is deduced from the encoding mode.

3. Dependency Tree of a Block

A dependency tree can be set up for a current block starting from the identified reference blocks for its prediction. The decoding of a block will be recursive because if the block uses blocks that have not yet been reconstructed, it would be necessary first of all to reconstruct these blocks in setting up a dependency tree for each one of them.

Figure 10:
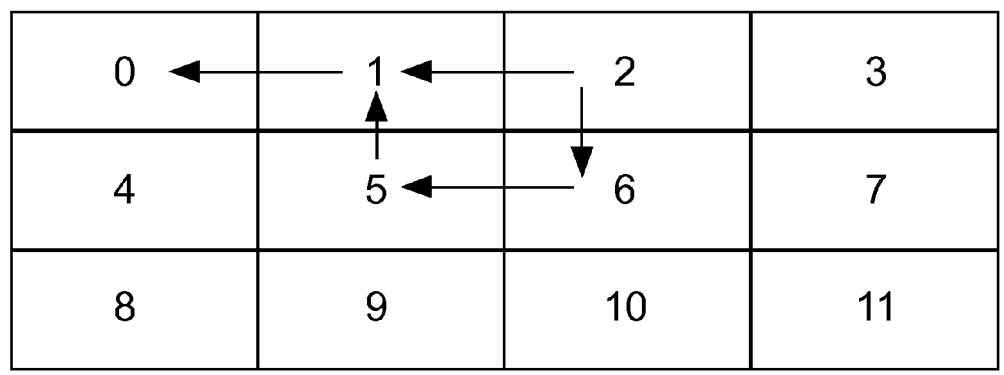
FIG. 10 is an example of a dependency tree for the decoding of blocks of a group of blocks.

FIG. 10 illustrates an example of dependencies between blocks. The dependency tree of the block 2 is given by:
2 depends on 1 and 6,
6 depends on 5,
5 depends on 1,
1 depends on 0.

The block 0 depends on no block of the image. It is encoded relatively to a null prediction or relatively to a temporal prediction only.

Then, the dependency tree is traced back: the block 0 is reconstructed and then the block 1 and then 5 and 6 and finally the block 2.

This example illustrates the mechanism of dependency between the blocks, which become more complex by the addition of predictions on the basis of reference blocks situated in the anti-causal zone of the current block.

It can be seen here that, as indicated here above, the decoding according to the order of reading of the blocks is no longer possible.

4. Example of Implementation of the Encoding

The encoding of the macroblocks (or of the blocks) can be done by putting several possible encoding modes in competition for each macroblock. For each current macroblock, a list of possible predictions is established as a function of neighboring macroblocks (spatial and temporal) already encoded for the current macroblock. The prediction relying on a predetermined criterion of performance, for example the best compromise between flowrate and distortion for the macroblock or block is selected.

It is also possible to set a threshold for this criterion and select the first prediction encountered that meets this threshold.

Figure 2:
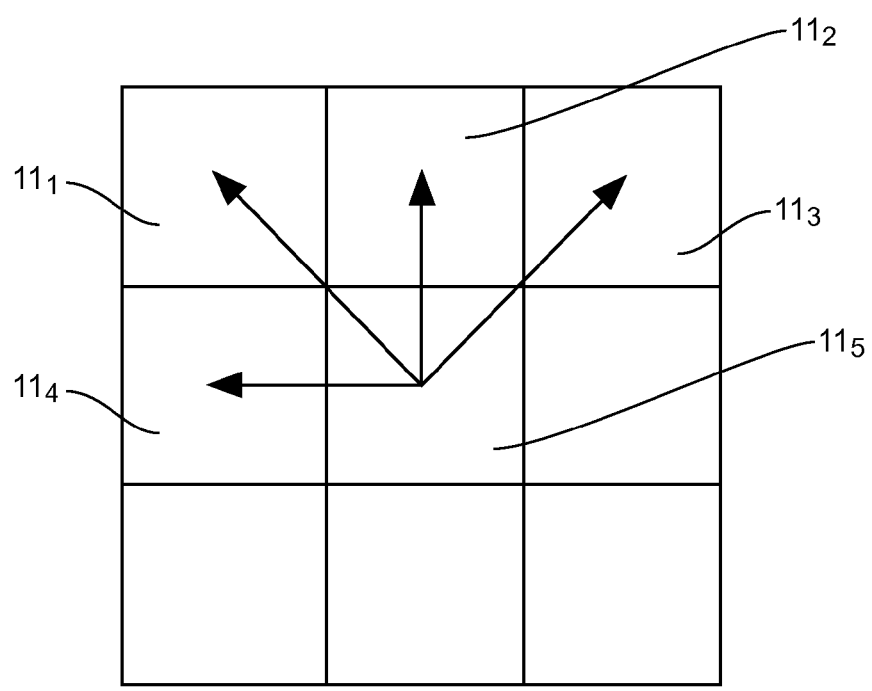
FIG. 2 presents the blocks usable for spatial weight in the case of groups of blocks of FIG. 1.
Figure 3A:
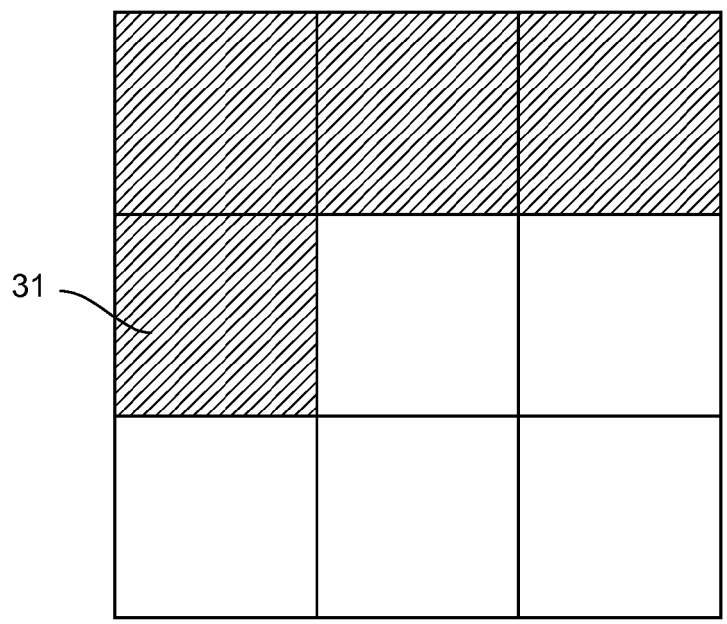
FIGS. 3A and 3B respectively illustrate causal and anti-causal zones for the example of FIG. 2.
Figure 3B:
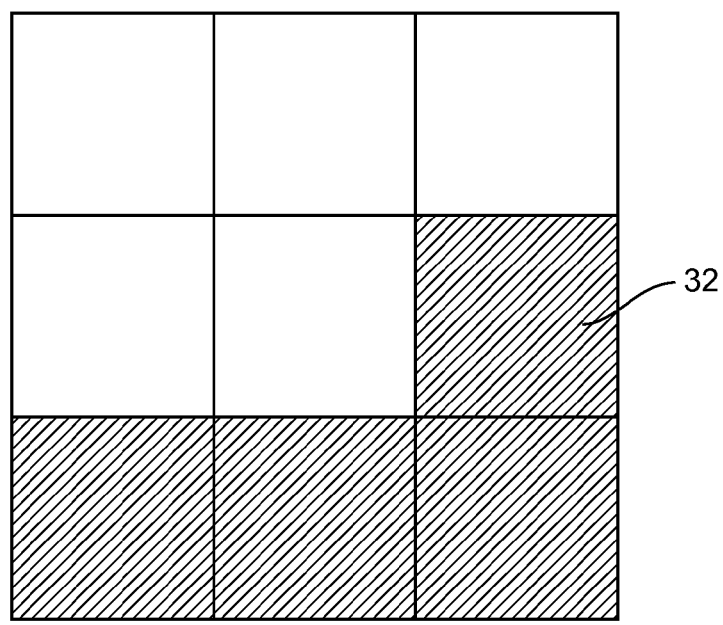

As already explained, a classic direction of scanning (direction of scanning the image from the top to the bottom in FIG. 2 for example) does not give the benefit of all the directions of prediction defined further above. The encoding proposed here implements several encoding passes, for which a distinct direction of scanning is defined. The block scan directions are therefore different for each encoding pass.

The macroblocks or blocks are encoded spatially by group. We consider M neighboring blocks to be encoded in the image, forming a group of macroblocks or blocks. These groups can be made randomly or may come from a stage of analysis.

Each group is encoded differently at each encoding pass, for a predetermined number of times or until a bit rate or distortion criterion defined for the group is attained.

The first block of the group is first of all encoded classically. If the group of blocks considered is the first group, the block is encoded without prediction relatively to its spatial neighbors. If not, the block may be encoded by using a prediction relatively to its already encoded neighbors of another group. In the case of an inter image, a classic temporal prediction is also possible.

Then, the other macroblocks of the group are encoded. When all the blocks of the group are encoded, the bit rate/distortion cost of encoding the group is computed by adding up all the bit rate/distortion costs of the blocks of the group.

Several encoding passes are made in order to encode the group. Each pass encodes the blocks of the group following a new encoding order.

The lowest bit rate/distortion cost of the encoding pass is kept and the blocks are encoded by means of the predictions defined during this encoding pass.

The encoding algorithm then passes next group until all the groups of blocks have been encoded.

Then the encoded blocks are transmitted and/or stored according to the block writing order.

Figure 11:
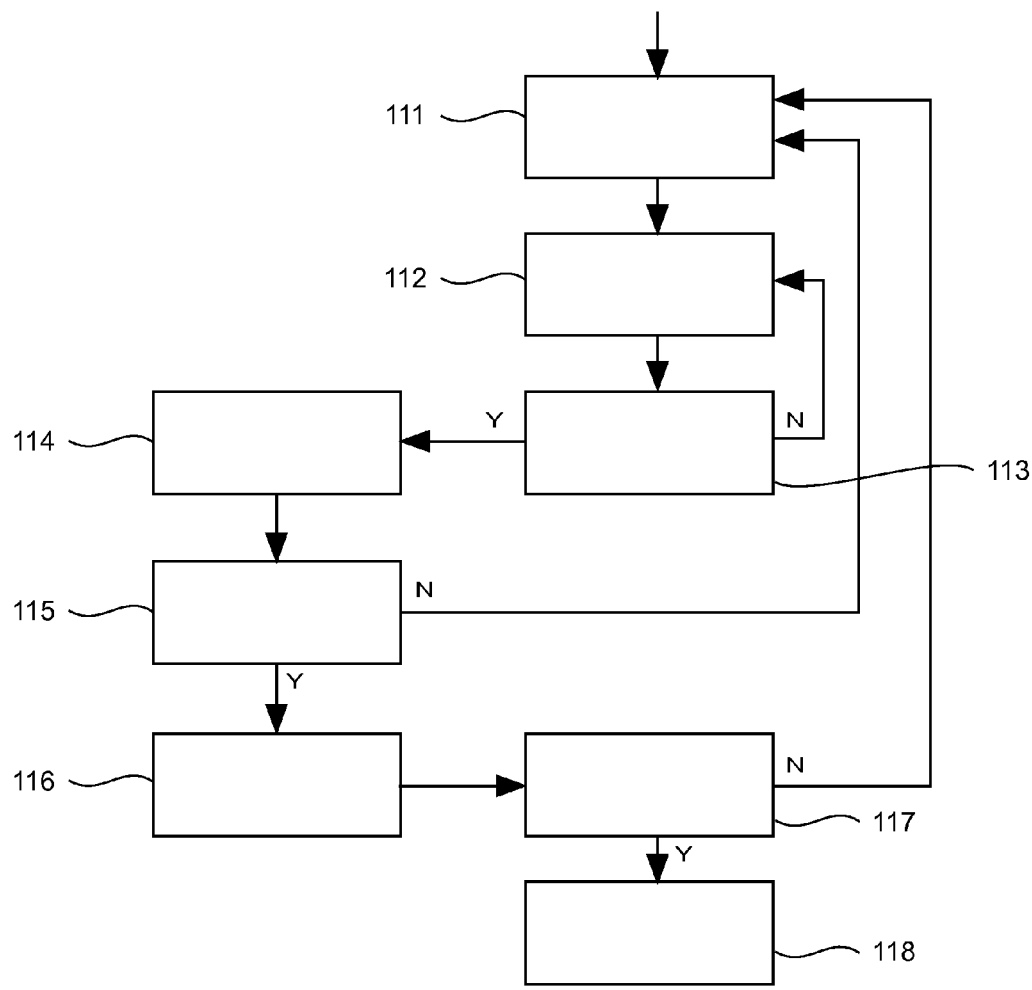
FIG. 11 is a block diagram illustrating an example of encoding according to an embodiment of the invention.

FIG. 11 gives a simplified view of an example of encoding of a group. A scan direction, or order, is selected (111). For the first scan, it may be a usual encoding scan order which will be used to build the signal to be transmitted and for the reading of the information of the blocks at decoding.

A block of the group undergoing encoding is encoded (112) in starting with the first according to the selected scanning order. So long as all the blocks of the group have not been encoded (test 113), a new block is encoded (112) according to the selected scanning order and in taking account, for the prediction, of the already encoded blocks.

When all the blocks of the group have been encoded, the encoding data is saved and a bit rate/distortion compromise is determined (114).

If the expected number of passes is not achieved (115) and/or if a bit rate/distortion threshold has not been attained, the operation loops back to the step 111 to select a new scanning order. It may be for example a spiral scan or any scan with any starting point in the group.

The steps 112 to 115 are repeated for this new scan order. In the step 114, it can be chosen to keep only the data corresponding to the most efficient pass.

When the expected number of passes is attained (test 115), and/or if a bit rate/distortion has been reached, the pieces of information of each block are preserved (116) for transmission and/or storage in the order corresponding to the most efficient pass. If the group of blocks processed is the last (test 117), the encoding of the blocks is terminated (118) and the method builds the stream, or signal, to be transmitted and/or stored, in the order of scanning of the blocks in the image or in the order of writing of the blocks (and not in the encoding scan order of the pass selected for a block).

If the group of blocks that has been processed is not the last (test 117), the method loops back to the step 111, in resetting the counting of the passes.

5. Decoding 5.1 First Embodiment of a Decoding of the Stream

The decoding comprises two major stages: the reading of the information associated with the blocks and the reconstruction of the blocks.

Figure 12:
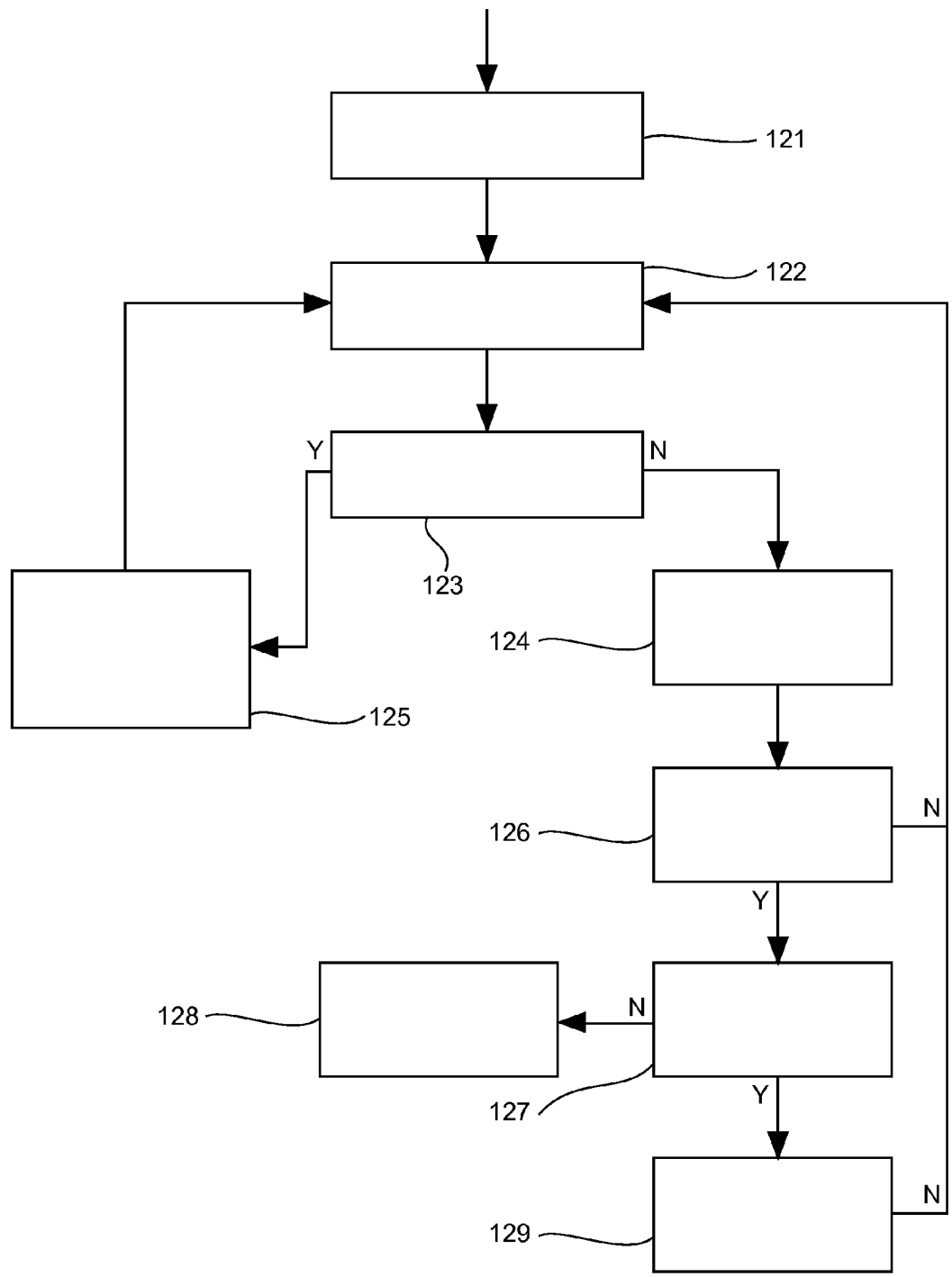
FIG. 12 is a block diagram of a first embodiment of the decoding.

In a first embodiment, illustrated by the diagram of FIG. 12, all the macroblocks of the encoded image are read successively, in the order of writing of the blocks in the stream (i.e. the order in which the blocks are written in the received stream, or signal, and in which their information items are saved).

The reconstruction of the blocks uses a stack in which all the macroblocks to be reconstructed are stacked.

As illustrated by FIG. 12, the stack is first of all initialized (121) with the first macroblock that had been read.

A reading 122 of the information associated with the first macroblock of the stack is used to determine (123) whether the reconstruction of this macroblock necessitates first of all the reconstruction of the reference macroblocks situated in the image. The reference macroblocks are the macroblocks used by the prediction of the current macroblock.

If the current macroblock uses no prediction, or if the prediction uses only macroblocks that are already reconstructed, then the current macroblock can be reconstructed (24).

If the current macroblock necessitates a prediction that uses macroblocks that are not yet reconstructed, these reference macroblocks are stacked (125) in the stack. The algorithm then returns to the step 122.

When a macroblock is decoded (124), the algorithm verifies (126) that the stack is empty.

If this stack is empty, the algorithm checks (127) that all the macroblocks of the image have been reconstructed. If the answer is yes, the decoding of the macroblocks of the image is terminated (128). If not, the next macroblock not decoded in the image scan direction is stacked (129) and the algorithm returns to the step 122.

If the stack is not empty (test 126), the algorithm returns to the step 122.

This decoding algorithm is used to decode all the macroblocks of the image in taking account of their dependency.

5.2 Second Embodiment of the Decoding of the Stream

Figure 13:
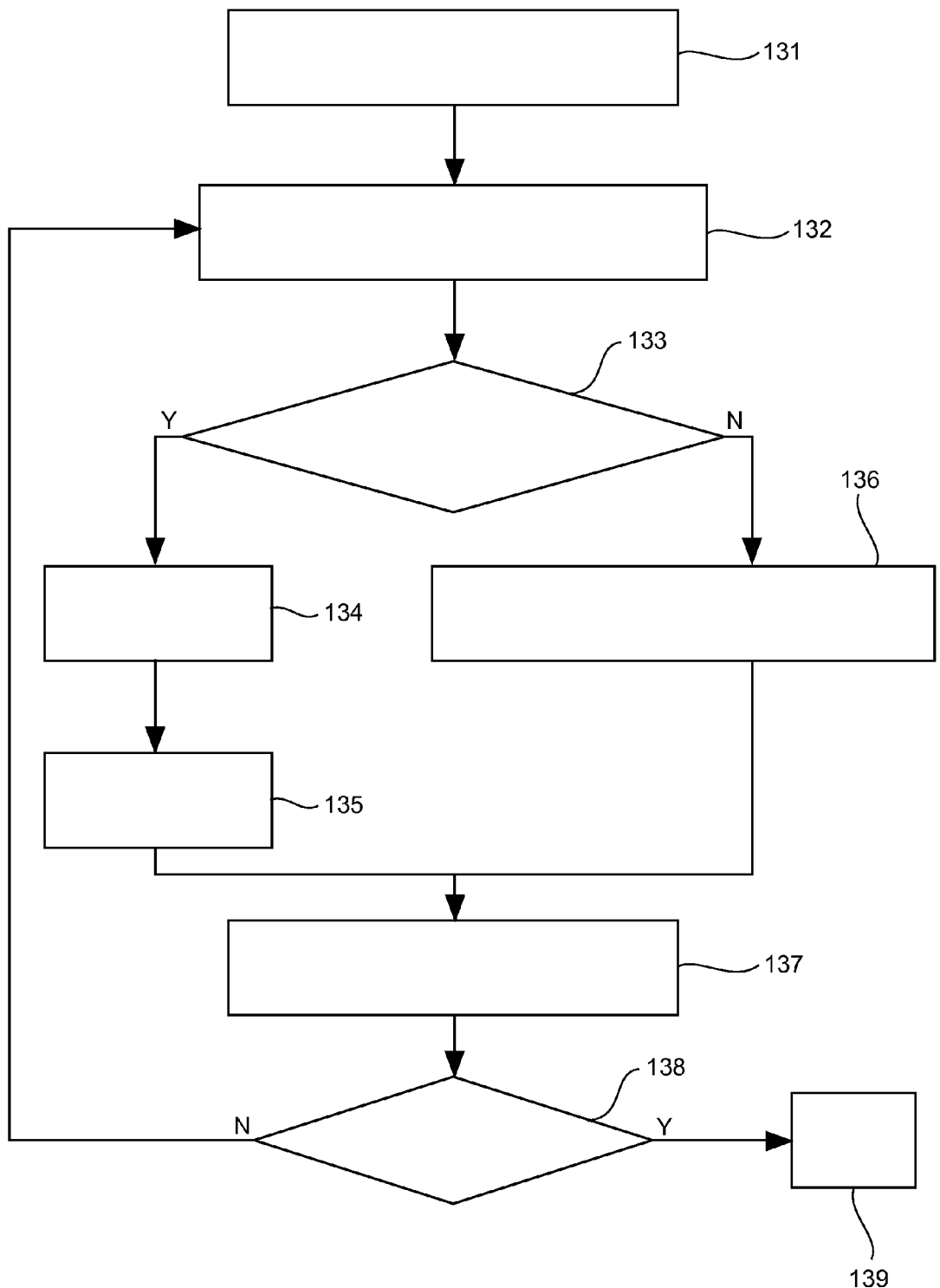
FIG. 13 is a block diagram of a second embodiment of the decoding.

According to a second embodiment, illustrated in FIG. 13, the decoding method implements a sorted-out list of block waiting times, with prioritization of blocks according to the index of the block having the maximum index.

The method therefore starts with an initialization step 131 for initializing this list as an empty list.

The blocks are then scanned in the order of scanning of the blocks in the image (for example according to the usual designation such as raster scan, spiral scan, rain scan order etc):

identification 132 of the dependencies of the current block as a function of the dependency tree associated with it;
    for the current block, according to the associated mode of encoding and predictions, determining 133 of the status which is immediately decodable or not decodable;
    if the block is decodable:
        decoding 134; and
        unstacking 135 of the decodable blocks in the waiting stack;
    if the block is not decodable:
        136: adding the block to the waiting list;
    passage 137 to the next block;
    if the last block is processed (138), end 139 of the processing; if not return to the step 132.

Figure 14:
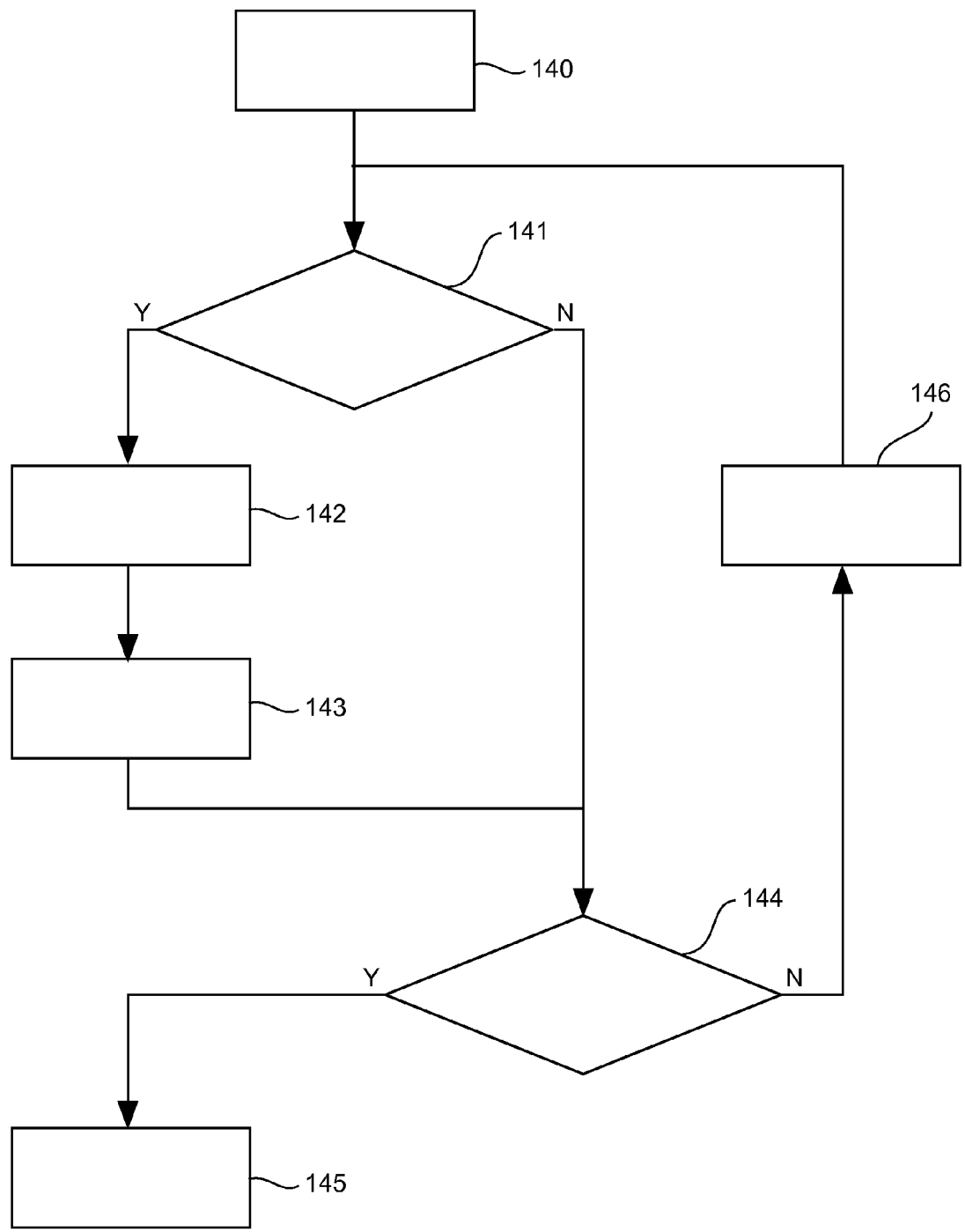
FIG. 14 is a more detailed view of the decoding of the blocks pending the method of FIG. 13.

The unstacking 135 of the decodable blocks is illustrated in greater detail by FIG. 14. The process is the following:
    scanning 140 of all the blocks of the waiting list;
    if the current block of the list can be decoded (i.e. if all the blocks on which it depends have already been decoded) 141:
        it is removed from the waiting line or stack (142);
        it is decoded (143);
        if all the blocks have been taken into account (end of scan) 144:
            end of processing of the waiting list (145);
        else, the operation passes to the next block (146) and the processing is resumed at the step 141.

This unstacking process, besides, is iterated repeated so long as the waiting list is not vacant and the unstacking operation has withdrawn at least one element from the waiting list.

Although the present disclosure has been described with reference to one or more examples, workers skilled in the art will recognize that changes may be made in form and detail without departing from the scope of the disclosure and/or the appended claims.

The invention claimed is:

1. A method for encoding image data, an image being sub-divided into blocks, said method implementing the steps of:
   predicting the data of a current block as a function of at least one other already encoded block known as a reference block, delivering a predicted block, wherein predicting takes account of a set of encoded blocks that are neighbors of said current block, comprising blocks not yet considered according to a predetermined write scan order;
   determining information on residues by comparison of said current block and of said predicted block;
   encoding said information on residues;
   transmitting and/or storing a data signal comprising a set of data associated with each block, comprising said information on residues according to said predetermined write scan order for scanning the writing of the data associated with the blocks encoded in said signal;
   building a dependency tree associating, with a current block, at least one reference block from which the predicted block associated with said current block has been predetermined; and
   inserting information representing said dependency tree in said set of data associated with each block.

2. The method of encoding according to claim 1, wherein said step of predicting comprises at least two prediction passes, for at least one of said source blocks, according to distinct prediction scan orders, and comprises selecting one of said prediction scan orders according to a predetermined criterion of efficiency.

3. A device for encoding image data, an image being sub-divided into source blocks, said device comprising:
   means for predicting the data of a current block as a function of at least one other already encoded block known as a reference block, delivering a predicted block, wherein the means for predicting take account of a set of encoded blocks that are neighbors of said current block, comprising blocks not yet considered along a predetermined write scan order;
   means for determining information on residues by comparison of said current block and of said predicted block;
   means for encoding said information on residues;
   means for transmitting and/or storing a data signal comprising a set of data associated with each block, comprising said information on residues according to said predetermined write scan order for the data associated with the blocks encoded in said signal,
   means for building a dependency tree associating, with a current block, at least one reference block from which the predicted block associated with said current block has been predetermined; and
   means for inserting information representing said dependency tree in said set of data associated with each block.

4. A non-transitory computer readable medium comprising program code instructions for executing for encoding image data, an image being sub-divided into blocks, when the instructions are executed on a computer, wherein the method comprises:
   predicting the data of a current block as a function of at least one other already encoded block known as a reference block, delivering a predicted block, wherein predicting takes account of a set of encoded blocks that are neighbors of said current block, comprising blocks not yet considered according to a predetermined write scan order;
   determining information on residues by comparison of said current block and of said predicted block;
   encoding said information on residues;
   transmitting and/or storing a data signal comprising a set of data associated with each block, comprising said information on residues according to a said predetermined write scan order for scanning the writing of the data associated with the blocks encoded in said signal;
   building a dependency tree associating, with a current block, at least one reference block from which the predicted block associated with said current block has been predetermined; and
   inserting information representing said dependency tree in said set of data associated with each block.

5. A method for decoding an image data signal, an image being subdivided into blocks, and said signal comprising a series of sets of data each associated with one of said blocks, according to said write scan order, said sets of data being read according to said write scan order, wherein the method comprises the following steps, for a current block:
   extracting, from said set of data, information representing a dependency tree associating, with a current block, at least one reference block from which the associated predicted block associated with said current block had been predetermined; and
   decoding said block when the reference block or blocks identified in said dependency tree have already been decoded, comprising the following sub-steps:
      predicting a predicted block from said reference block or blocks; and
      reconstructing a decoded block from said predicted block and as a function of information on residues presented in said set of data.

6. The method according to claim 5, wherein the method comprises the following steps for a current block:
   if the reference block or blocks identified in said dependency tree have already been decoded, immediate decoding of said current block;
   if not, inserting the set of data in said current block in a waiting stack; and
   processing of the following block according to said write scan order.

7. The method according to claim 6, wherein the method comprises storing reference blocks necessary to decode a waiting block, and decoding said waiting block as soon as all the reference blocks necessary are available.

8. The method according to claim 6, wherein the decoding is done in successive passes according to said write scan order, a current block being decoded during one of said passes if all of said reference blocks are available.

9. The method according to claim 5, wherein, for at least one current block, said prediction sub-step takes account of at least two reference blocks, a weighting value being allotted to each of said reference blocks.

10. The method according to claim 5, wherein, for at least one current block, said prediction sub-step takes account of at least one reference block overlapping at least two source blocks.

11. A non-transitory computer readable medium comprising program code instructions for executing a method for decoding an image data signal, when the instructions are executed on a computer, an image being subdivided into blocks, and said signal comprising a series of sets of data each associated with one of said blocks, according to said write scan order, said sets of data being read according to said write scan order, wherein the method comprises the following steps, for a current block:
- extracting, from said set of data, information representing a dependency tree associating, with a current block, at least one reference block from which the associated predicted block associated with said current block had been predetermined; and
- decoding said block when the reference block or blocks identified in said dependency tree have already been decoded, comprising the following sub-steps:
  - predicting a predicted block from said reference block or blocks; and
  - reconstructing a decoded block from said predicted block and as a function of information on residues presented in said set of data.

12. A device for decoding an image data signal, an image being subdivided into blocks, and said signal comprising a series of sets of data each associated with one of said blocks, according to said write scan order, said sets of data being read according to said write scan order, wherein said device comprises: decoding means providing, for at least one of said blocks, for a decoding according to an order of decoding distinct from said write scan order, wherein the decoding means comprises, for decoding a current block:
- means for extracting, from said set of data, information representing a dependency tree associating, with a current block, at least one reference block from which the associate predicted block associated with said current block had been predetermined; and
- means for decoding said block as a function of information on residues present in said set of data when the reference block or blocks identified in said dependency tree have already been decoded.

* * * * *

UNITED STATES PATENT AND TRADEMARK OFFICE
CERTIFICATE OF CORRECTION

| | | |
|---|---|---|
| PATENT NO. | : 8,320,692 B2 | Page 1 of 1 |
| APPLICATION NO. | : 13/002441 | |
| DATED | : November 27, 2012 | |
| INVENTOR(S) | : Stephane Pateux et al. | |

It is certified that error appears in the above-identified patent and that said Letters Patent is hereby corrected as shown below:

In the claims

In column 16, Claim 4:

in line 17, delete "a".

Signed and Sealed this
Fifteenth Day of December, 2015

Michelle K. Lee
*Director of the United States Patent and Trademark Office*